(12) United States Patent
Kohn et al.

(10) Patent No.: US 8,169,910 B1
(45) Date of Patent: May 1, 2012

(54) NETWORK TRAFFIC ANALYSIS USING A FLOW TABLE

(75) Inventors: Jack Kohn, Mountain View, CA (US); David Rowell, Mountain View, CA (US); Fuguang Shi, Saratoga, CA (US); Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 256 days.

(21) Appl. No.: 11/923,057

(22) Filed: Oct. 24, 2007

(51) Int. Cl.
*H04L 12/28* (2006.01)

(52) U.S. Cl. .................... 370/235; 370/395.32; 709/224

(58) Field of Classification Search .................... 370/235
See application file for complete search history.

(56) References Cited

U.S. PATENT DOCUMENTS

| | | | |
|---|---|---|---|
| 4,704,696 A * | 11/1987 | Reimer et al. | 704/275 |
| 2002/0138618 A1* | 9/2002 | Szabo | 709/225 |
| 2003/0033467 A1* | 2/2003 | Yoshizawa et al. | 710/305 |
| 2005/0005023 A1* | 1/2005 | Dobbins et al. | 709/238 |
| 2005/0013300 A1* | 1/2005 | Akahane et al. | 370/395.3 |
| 2005/0132044 A1* | 6/2005 | Guingo et al. | 709/225 |
| 2005/0154627 A1* | 7/2005 | Zuzek et al. | 705/10 |
| 2005/0280743 A1* | 12/2005 | Dresti et al. | 348/734 |
| 2007/0076606 A1* | 4/2007 | Olesinski et al. | 370/230 |
| 2007/0140128 A1* | 6/2007 | Klinker et al. | 370/238 |
| 2007/0153689 A1* | 7/2007 | Strub et al. | 370/230 |
| 2008/0028467 A1* | 1/2008 | Kommareddy et al. | 726/23 |

* cited by examiner

*Primary Examiner* — Jianye Wu
(74) *Attorney, Agent, or Firm* — Harrity & Harrity, LLP (57) ABSTRACT

A device may receive a data unit at a line interface of a network device, convey the data unit to a first component in the line interface, update a flow table in the first component based on the data unit, send a message to a second component in the network device, the message describing the update to the flow table, and forward the data unit from the first component to another line interface in the network device.

34 Claims, 9 Drawing Sheets

| SOURCE AND DESTINATION MAC ADDRESSES 802 | FLOW TYPE 804 | FLOW TABLE INDEX 806 | FLOW HASH 808 |
|---|---|---|---|
| FLOW DATA UNIT NUMBER 810 | TIMESTAMP 812 | ORIGINAL PACKET 814 | |

NETWORK TRAFFIC ANALYSIS USING A FLOW TABLE

BACKGROUND

Network devices, such as switches or routers, may be used not only to route and/or switch packets to their destinations at different network layers, but also to collect information related to clients, applications and traffic statistics in the network.

SUMMARY

According to one aspect, a method may include receiving a data unit at a line interface of a network device, conveying the data unit to a first component in the line interface, updating a flow table in the first component based on the data unit, sending a message to a second component in the network device, the message describing the update to the flow table, and forwarding the data unit from the first component to another line interface in the network device.

According to another aspect, a network device may include a line interface. The line interface may include a visibility processor and a component that include a flow table. The component may be configured to buffer a data unit that is received at a line interface, locate a record of a flow associated with the data unit in the flow table, modify the record in the flow table based on the data unit, and send an update message to a visibility processor, the update message indicating a change in the record. The visibility processor may be configured to aggregate flow records in a shadow table in accordance with the update message.

According to yet another aspect, a device may include means for buffering a data unit that is received at a line interface, means for locating a record of a flow associated with the data unit, means for changing the record based on the data unit, and means for sending an update message to a visibility processor, the update message indicating the change in the record. The device may further include means for aggregating flow records in accordance with the update message at the visibility processor and means for receiving the aggregated flow records from the visibility processor.

DETAILED DESCRIPTION OF PREFERRED EMBODIMENTS

The following detailed description refers to the accompanying drawings. The same reference numbers in different drawings may identify the same or similar elements.

In the following, a network device may employ a flow table to manage information about data units (e.g., packets). The flow table may include information related to flows (e.g., a number of packets that are received at a device in a period of time, where the packets have the same source and destination addresses and port numbers). Because information that has been obtained by a forwarding module for routing or switching data units is easily incorporated into the flow table, the flow table may be updated and managed with minimal latency to routing and/or switching. In addition, because flow tables may be uniformly located at points where all data units flow through, the flow tables may be used to collect and manage flow statistics and samples (e.g., copies) of data units homogenously and therefore, conveniently.

The term "data unit," as used herein, may refer to a packet, datagram, cell, a fragment of a packet, or other types of data that may be carried at a specified communication layer. The term "sample" or "sample data unit," as used herein, may refer to a full copy or a partial copy of the data unit.

The term "visibility," as used herein, may refer to availability of information/data about data units to users, non-local components, external devices, and/or users. Furthermore, the term "visibility engine" may refer to a hardware/software component for obtaining the information/data from the data units. The information/data may or may not require further processing before the information/data is rendered available to an application, a device, or a user.

The term "source," as used herein, may refer to a node (e.g., network node, a network socket, etc.) from which data units emerge. The term "destination," used herein, may refer to a node to which the data units are sent. A source or a destination may be a logical network source or destination that is associated with one or more identifiers, such as an Internet Protocol (IP) address, a port number, etc. The term "flow," as used herein, may refer to a stream of data units from a source to a destination. A flow may or may not have a start time (e.g., time when a flow begins) and/or an end time (e.g., time when the flow terminates). As used herein, the term "flow statistics" may refer to information about a flow, such as a byte count, a number of data units, a start time, etc. The term "shadow," as used herein, may refer to an object that reflects the contents of an original object over a time period. For example, a shadow of a cache may include information that has been temporarily placed in the cache over several minutes. A shadow may include items that are no longer in the original. A shadow, thus, may accumulate the contents of a given object over time.

In the following, data units that are received at a network device may be placed in a flow table. The flow table may include flow statistics, which may be conveyed to a processor. The processor may aggregate and/or export the flow statistics to a visibility engine and/or other components.

In addition, some of the data units that are used to update the flow table may be sampled and sent to the visibility engine. The visibility engine may inspect the samples and forward the result of the inspection to the processor, to be correlated with the flow statistics. The flow statistics and/or the result of the inspection may be used for many applications, such as network planning, troubleshooting, virus/worm detection, packet latency measurements, etc.

Figure 1:
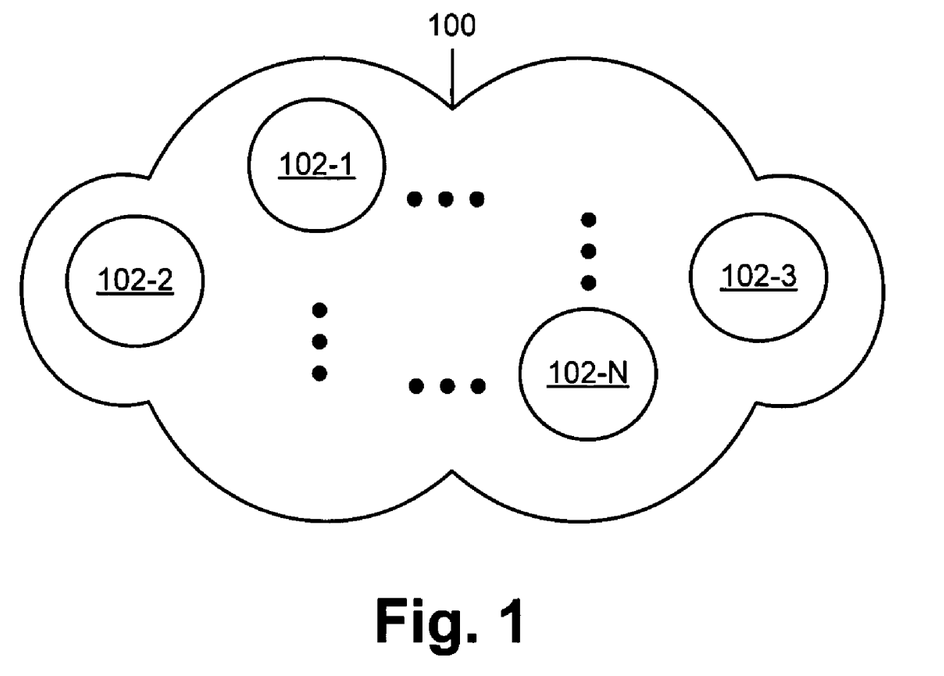
FIG. 1 is a diagram of an exemplary network in which concepts described herein may be implemented.

FIG. 1 is a diagram of an exemplary network 100 in which concepts described herein may be implemented. Network 100 may include the Internet, an ad hoc network, a local area network (LAN), a wide area network (WAN), a metropolitan area network (MAN), a cellular network, a public switched telephone network (PSTN), any other network, or combinations of networks.

As shown, network 100 may include N network devices 102-1 through 102-N (collectively referred to herein as "network device 102"). Each of network devices 102-1 through 102-N may include a switch, a router, a server, and/or another type of device. While network devices 102 may be implemented as different types of devices, in the following paragraphs, network devices 102 will be described herein in terms of a router or a switch.

Figure 2:
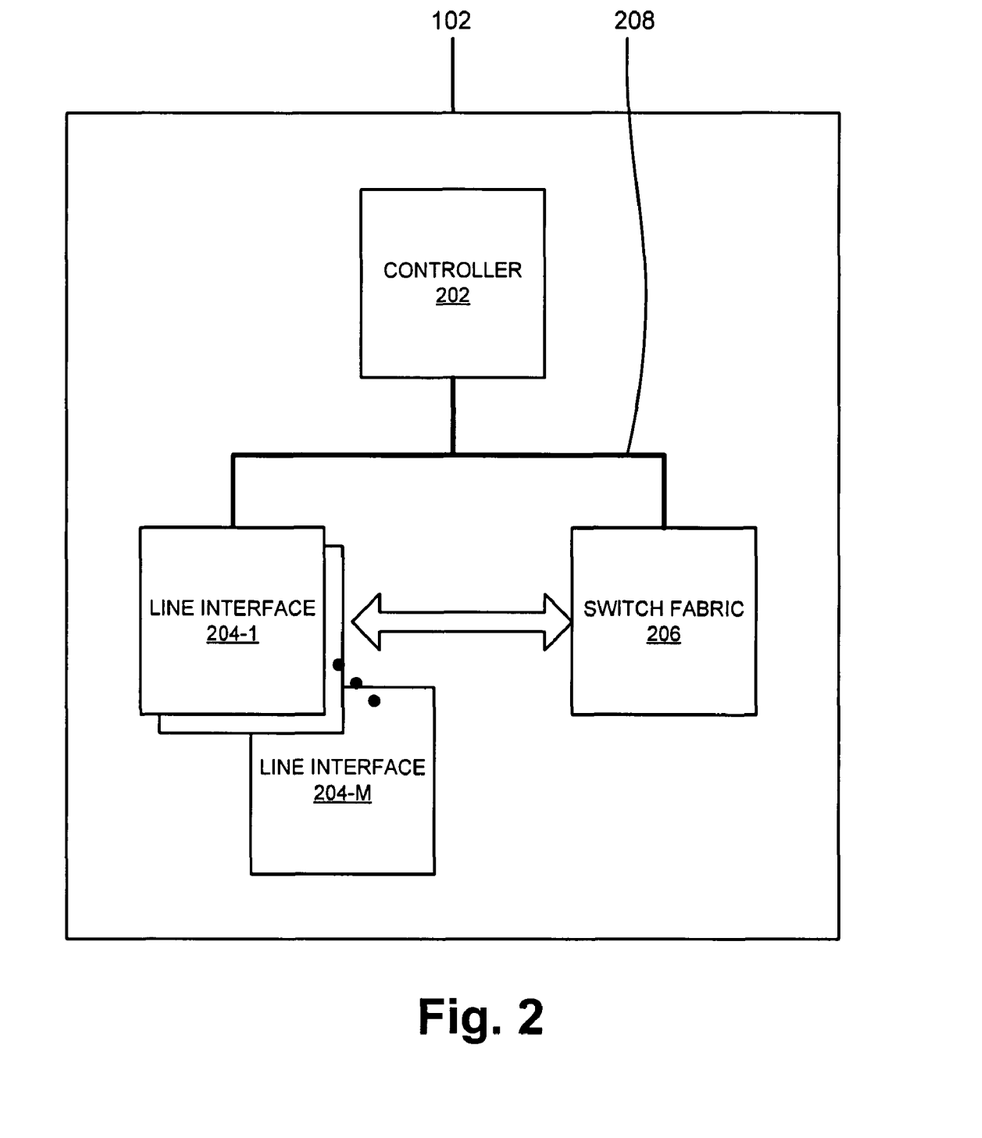
FIG. 2 is a block diagram of an exemplary network device of the exemplary network of FIG. 1.

FIG. 2 is a block diagram of an exemplary network device 102. As shown, network device 102 may include a controller 202, M line interfaces 204-1 through 204-M (collectively referred to herein as "line interface 204"), a switch fabric 206, and a communication path(s) 208. Depending on implementation, network device 102 may include additional, fewer, or different components than those illustrated in FIG. 2. For example, in one implementation, network device 102 may include modules for rendering network services, such as a firewall service, a load balancing service, etc.

Controller 202 may include devices for managing routes, flow statistics, and/or types of information that demand centralized processing. Controller 202 may manage routes (e.g., accept or disseminate routes) in accordance with routing/signaling protocols. In addition, controller 202 may receive and process flow statistics from other components of network device 102 (e.g., line interface 204).

Line interfaces 204-1 through 204-M may include devices for receiving data units from devices in network 100 and for transmitting the data units to other devices in network 100. In addition, each of line interfaces 204-1 through 204-M may perform data unit forwarding, data unit classification, internal redirection of data units to other components in network device 102, and/or extraction and management of a flow table and samples from data units.

Switch fabric 206 may include switches for conveying data units from line interfaces 204-1 through 204-M or other modules (not shown) to others of line interfaces 204 or the other modules. Communication path(s) 208 may provide an interface through which components of network device 102 can communicate with one another.

Figure 3:
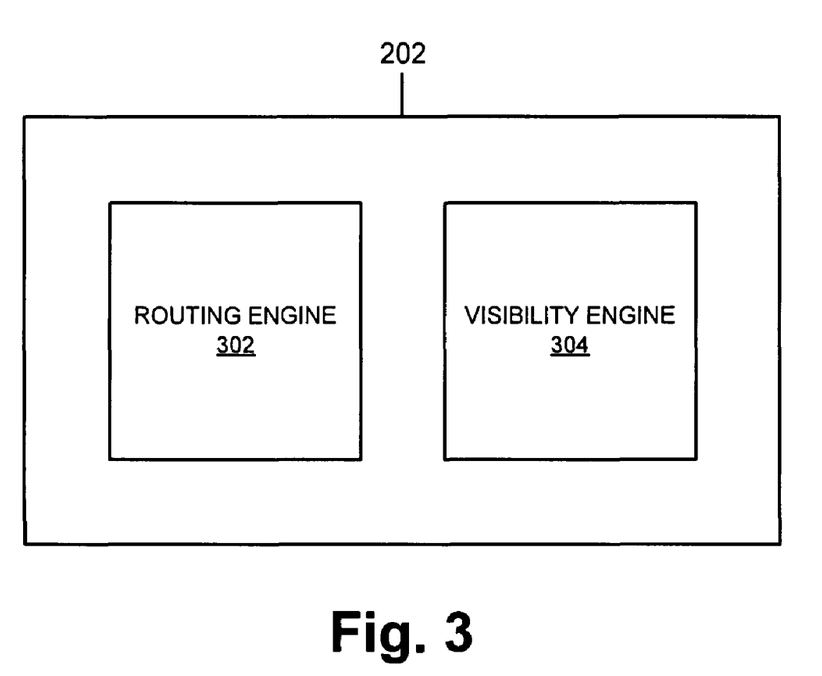
FIG. 3 is a functional block diagram of the exemplary controller of FIG. 2.

FIG. 3 is a functional block diagram of controller 202. As shown, controller 202 may include a routing engine 302 and a visibility engine 304. Depending on implementation, controller 202 may include additional, fewer, and/or different components than those illustrated in FIG. 3.

Routing engine 302 may include hardware and/or software for communicating with other routers to gather and store routing information. Visibility engine 304 may include one or more devices for performing traffic analysis. Visibility engine 304 may receive sample data units from line interface 204, process/analyze the samples (e.g., identify applications associated with the samples), and/or send the processed samples to line interface 204.

Visibility engine 304 may use some of the samples for deep data unit inspection. The deep data unit inspection may entail examining data units for non-compliance with communication protocols, security violations (e.g., virus, intrusion, etc.), and/or features that warrant further statistical analysis. In addition, visibility engine 304 may import processed flow statistics from line interface 204.

Figure 4:
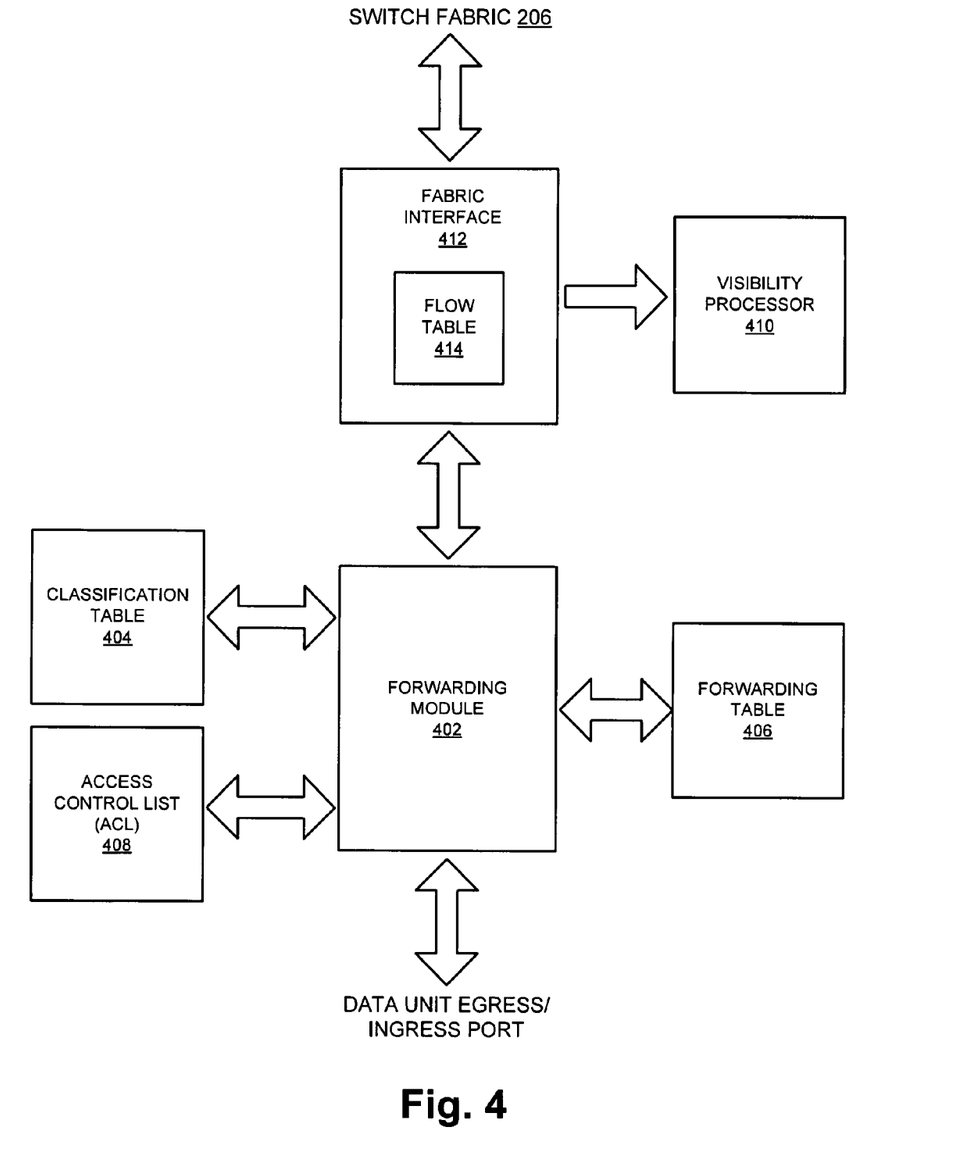
FIG. 4 is a functional block diagram of the exemplary line interface of FIG. 2.

FIG. 4 is a functional block diagram of exemplary line interface 204. As shown, line interface 204 may include a forwarding module 402, a classification table 404, a forwarding table 406, an access control list (ACL) 408, a visibility processor 410, and a fabric interface 412. Depending on implementation, line interface 204 may include fewer, additional, or different elements than those illustrated in FIG. 4.

Forwarding module 402 may include hardware and/or software for forwarding and/or classifying a data unit that is received at line interface 204. Forwarding module 402 may perform a lookup in classification table 404, forwarding table 406, and/or ACL 408, and may obtain a data unit descriptor that includes a forwarding address (e.g., a destination switch fabric port, a destination network port, etc.). In addition, forwarding module 402 may augment the data unit by appending the data unit descriptor to the data unit, and either forward the data unit to one of line interfaces 204-1 through 204-M. In different implementations, forwarding module 402 may include other components, such as flow table 414.

Classification table 404 may include rules for categorizing a data unit based on a data unit header. Examples of classification rules may include rules for performing an ACL lookup (e.g., if a field in a data unit header is one of specified values, perform a lookup in ACL 408), for performing a policy based routing (e.g., if a data unit header is a telephony data unit, route the data unit from X to Y via an asynchronous transfer mode (ATM) circuit), and for rendering differentiated quality of service (QoS). Forwarding table 406 may include information for identifying an egress line interface to forward an incoming data unit to a network node based on the data unit's network destination address. ACL 408 may include a list of rules that detail services or service ports that are available on network device 102.

Visibility processor 410 may include hardware and/or software for managing flow records and correlating the flow records with sample data units from visibility engine 304. In managing flow records, visibility processor 410 may receive flow statistics from fabric interface 412, aggregate and/or maintain the flow statistics in records of a shadow table, and export the aggregated flow statistics to another component in network device 102 (e.g., visibility engine 304), or alternatively, to a network element that is external to network device 102.

Visibility processor 410 may aggregate the flow statistics based on various parameters, such as a communication protocol, a port number, source and/or destination addresses, a source/destination address prefix, a source/destination autonomous system (AS) prefix, etc. The aggregated flow statistics may be exported to other components in network device 102 or other network devices based on different export schemes (e.g., NetFlow 9.0).

Visibility processor 410 may correlate a flow record with a sample data unit by using a flow table index. An application or a device that receives the flow record and the correlated sample from visibility processor 410 may use the record and the correlated sample to extract other information, such a latency of an application response to a request packet, a number of requests for creating and destroying endpoints of connections per unit time, etc.

Fabric interface 412 may include hardware and/or software for providing an interface to switch fabric 206, sampling data units, and managing the sampled data units and/or flow statistics. Fabric interface 412 may include one or more interfacing buffers (not shown) for temporarily storing augmented data units from forwarding module 402. The buffers may prevent the data units from being dropped if a bottleneck (e.g., a processing delay) develops on a line interface-to-line interface path during data unit transport.

Fabric interface 412 may sample and manage the sampled data units. Depending on control settings, the data units may be sampled in one of several ways. For example, in one setting, a flow may be selected based on a classification rule (e.g., an ACL classification rule), and first T (e.g., an integer) data units in the selected flow may be sampled. Alternatively, given the selected flow, data units may be randomly sampled.

In another setting, one or more flows may be selected randomly, and the first T data units in each of the selected flows may be sampled. Alternatively, for each randomly selected flow, data units may be randomly sampled.

In making a random selection of flows, a hash value of a first data unit header may be compared to a selected value. If the computed hash value of the first data unit header of a new flow matches a selected range of values, then that new flow may be chosen for sampling. The hash function and the selected range of values may be chosen to increase the odds of obtaining statistically significant number of correlated flows.

For example, assume that applying a hashing function to the source and destination addresses of a data unit yields the same hash as applying the hashing function to the destination and source addresses (e.g., the hash is symmetric with respect to the destination address and the source address). In such a case, comparing the hash to the selected range of values may result in the selection of two flows, each of whose source and destination addresses are the destination and source addresses of the other flow. Consequently, data units that belong to the two flows that are part of a transaction between two network endpoints may be sampled.

For example, if a hash is symmetric with respect to addresses 191.178.21.2 and 191.178.3.5, data units whose source and destination addresses are 191.178.21.2 and 191.178.3.5 may be sampled, as well as data units whose source and destination addresses are 191.178.3.5 and 191.178.21.2.

Figure 5:
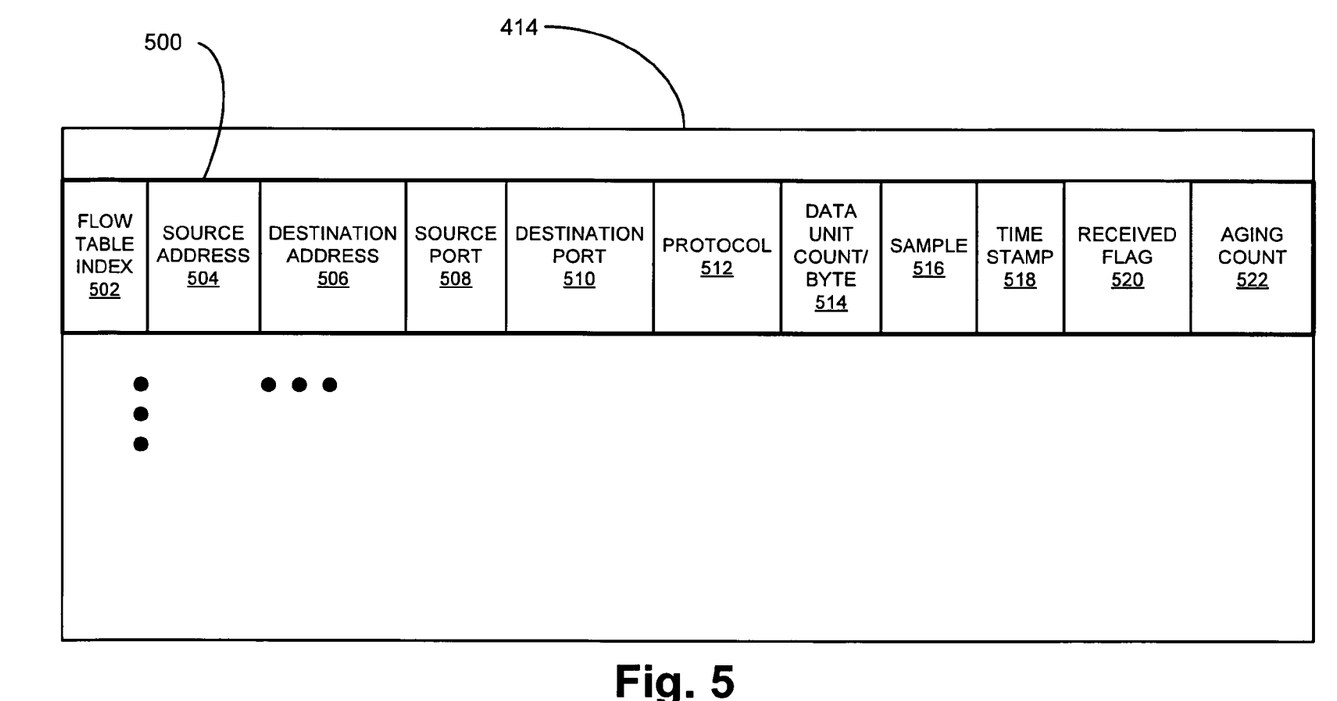
FIG. 5 is a block diagram of the exemplary flow table of FIG. 4.

As further shown in FIG. 4, fabric interface 412 may include a flow table 414, in which fabric interface 412 may create, manage, and/or delete records of flow statistics. FIG. 5 is a block diagram of flow table 414. In different implementations, flow table 414 may be included in and handled (e.g., records of flow statistics are created, managed, deleted, etc.) by another component, such as forwarding module 402. In other implementations, flow table 414 may be placed in any position between switch fabric 206 and a point at which forwarding lookup/processing occurs.

As shown in FIG. 5, flow table 414 may include records of flow statistics. Each record 500 may include a flow table index field 502, a source address field 504, a destination address field 506, a source port field 508, a destination port field 510, a protocol field 512, a data unit count/byte field 514, a sample field 516, a time stamp field 518, a received flag field 520, and an aging count field 522. In other implementations, flow record 500 may include additional, fewer, or different fields. For example, flow table 414 may include another time stamp field, for indicating a time of the last update to flow record 500.

Flow table index field 502 may indicate a location of flow record 500 within flow table 414. Source and destination address fields 504 and 506 may contain source and destination addresses (e.g., IP address) that are associated with a flow. Source and destination port fields 508 and 510 may include information indicating source and destination ports (e.g., port 83 for web server) for the flow. Protocol field 512 may indicate a communication protocol (e.g., Transport Control Protocol (TCP)) for the flow.

Data unit/byte fields 514 may indicate the number of data units (e.g., packets) and bytes that have been transferred by the flow. In automated management of flow table 414, data unit/byte fields 514 can be used to ensure sampling and delivery of the first N data units to visibility engine 304, by comparing the contents of data unit/byte fields 514 to N, which may be obtained through a lookup in classification table 404. Sample field 516 may include a bit value that indicates if data units pertaining to the flow are to be sampled. In a different implementation, sample field 516 may contain a target sample size (e.g., the desired number of samples). Time stamp field 518 may indicate the time at which the flow record was created.

Received flag field 520 may indicate whether a data unit has been received. In one implementation, received flag field 520 may be accessed sequentially, and therefore, faster than some other fields of flow record 500. In such a case, received flag field 520 may be used by a process/thread to quickly determine if a data unit that pertains to flow record 500 has just been received.

Aging count field 522 may indicate a remaining time until flow record 500 is aged out (e.g., removed) from flow table 414. In one implementation, during maintenance of flow table 414, if received flag 520 is set, a process/thread for modifying part of flow table 414 may insert a particular value in aging count field 522. If received flag 520 is not set, the process/thread may the value in decrement aging count field 522, unless aging count field 522 contains zero. If aging count field 522 contains zero, flow record 500 may be aged out (e.g., removed) from flow table 414.

Exemplary Process for Updating Flow Table

Figure 6A:
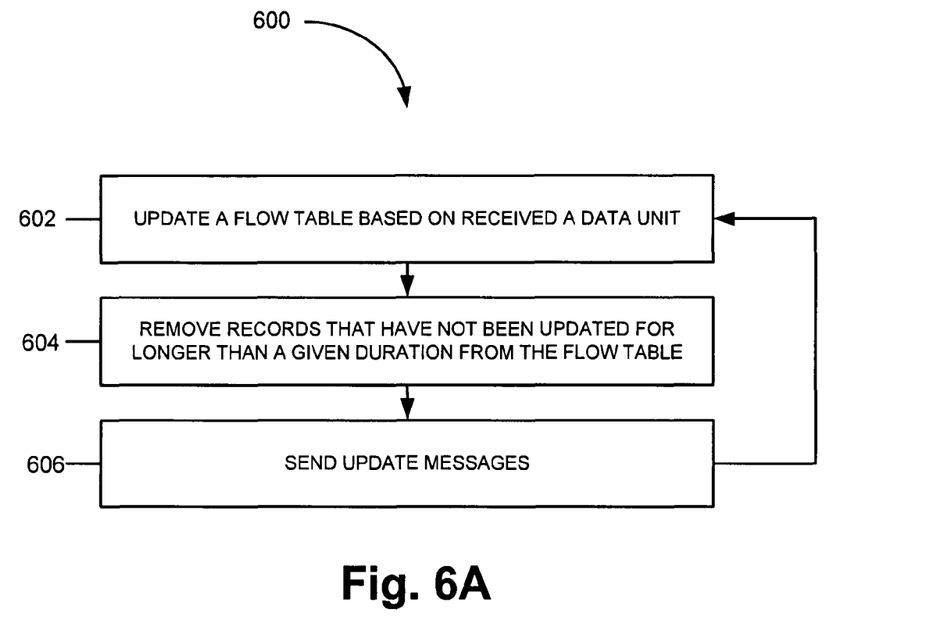
FIG. 6A is a flow diagram of an exemplary process for updating the flow table of FIG. 5.
Figure 6B:
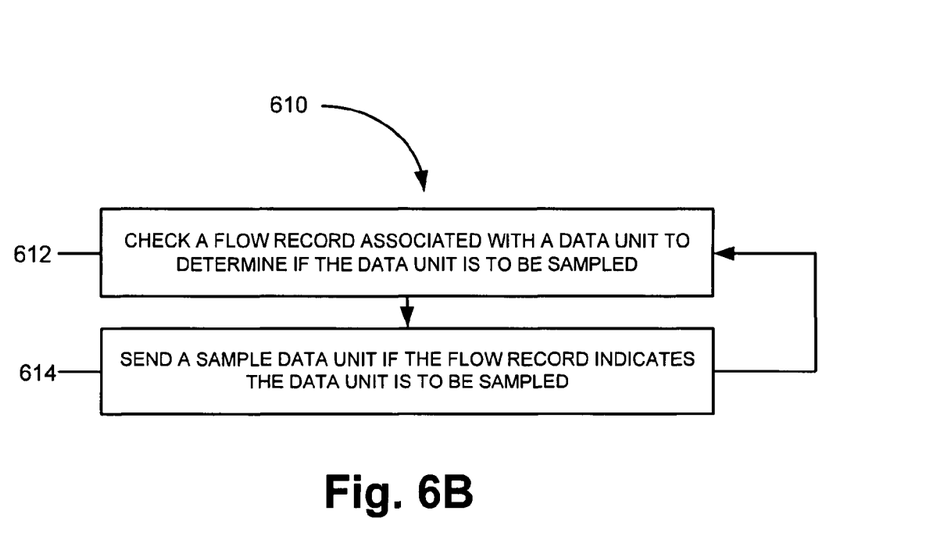
FIG. 6B is a flow diagram of an exemplary process for sending messages from a fabric interface when the flow table of FIG. 5 is updated.

The above paragraphs describe system elements that are related to devices and/or components for automated management of flow table 414. FIGS. 6A and 6B show exemplary processes 600 and 610 that are capable of being performed by one or more of these devices and/or components.

FIG. 6A is a flow diagram of part an exemplary process 600 for updating flow table 414. Process 600 may begin at block 602, where flow table 414 may be updated based on a received data unit. The update may depend on a header of the data unit and the state of flow table 414 (e.g., flow table is full).

If a portion of a data unit header matches a portion of a flow record in flow table 414, the record may be updated. More specifically, data unit count/byte field 514 may be modified to account for the new data unit. If a portion of the data unit header does not match any corresponding portions of records in flow table 414, and flow table 414 is not full, a new record may be created with fields that are illustrated in FIG. 5. If the portion of data unit header does not match any corresponding portions of records in flow table 414, and flow table 414 is full, flow table 414 may not be modified.

Flow records that have not been updated for longer than a particular duration may be removed from flow table 414 (block 604). Removing the flow records may provide space in flow table 414 for new flow records.

Update messages may be sent (block 606). An update message may include a flow creation message, a flow removal message, a flow loss message, or a long lived message. A flow record creation message and a flow record removal message may be sent by fabric interface 412 when flow table 414 obtains a new flow record and when an old flow record is removed from flow table 414, respectively. A flow record loss message may be sent when flow table 414 is unable to accommodate a new flow record because flow table 414 is full. In one implementation, an update message may be sent as a datagram that is received by visibility processor 410, which may maintain a shadow of flow table 414. A long lived message may be sent periodically to report on the status of flows that are in the flow table for an extended period of time. Long lived messages may permit network device 102 to provide visibility to resource utilization by various applications (e.g., voice over IP (VoIP) applications) when long lived flows are present in flow table 414 (e.g., flows that are associated with VoIP applications).

Figure 7:
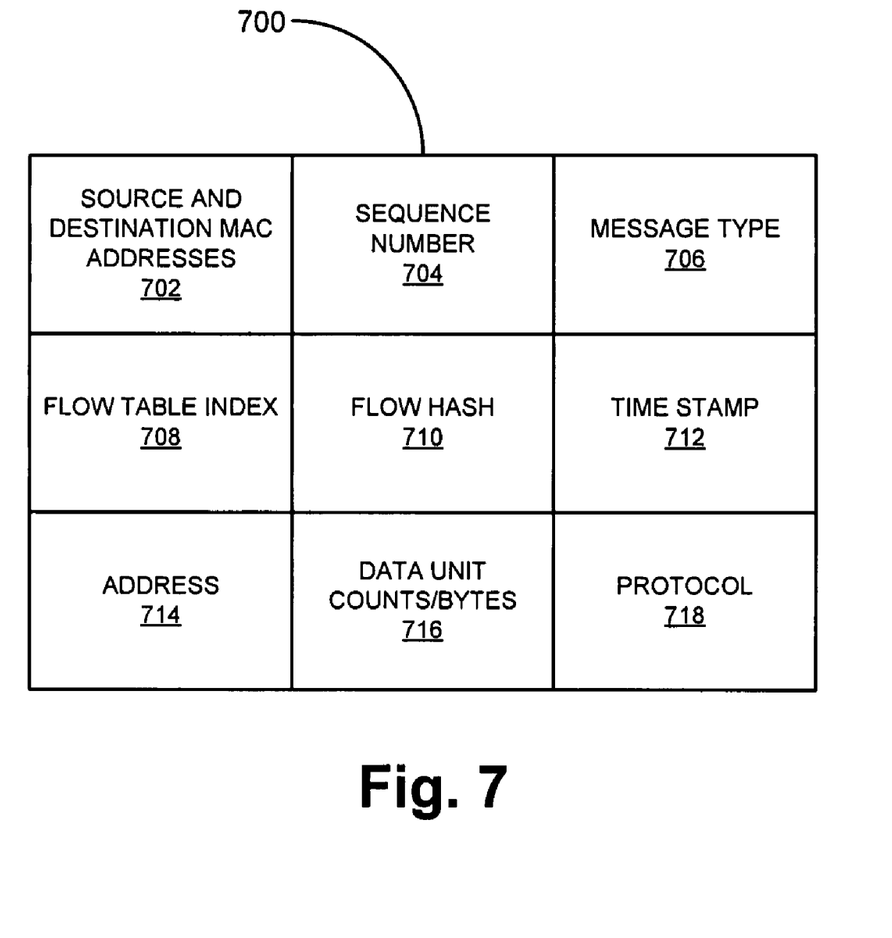
FIG. 7 is a block diagram of an exemplary message that carries a flow record.

FIG. 7 is a block diagram of an exemplary update message 700. As shown, update message 700 may include a source and destination Media Access Control (MAC) addresses field 702 for designating source and destination components within network device 102; a sequence number field 704 for indicating the number of different sub-messages that are carried by update message 700; a message type field 706 for indicating the type of message (e.g., a flow record creation message, a flow record removal message, etc.); a flow table index field 708 for indicating the location, in the flow table, at which a flow record may be found; a flow hash field 710 for carrying a hash of a header of the flow record; a time stamp field 712 for indicating the time of the creation of the flow record; address fields 714 for indicating source and destination addresses and/or ports for the flow record; data unit counts/bytes fields 716 for indicating the number of data units and/or bytes that are part of a flow being tracked by the flow record; and a protocol field 718 for indicating a communication protocol that is associated with the flow.

Depending on implementation, update message 700 may include additional, fewer, and/or different fields than those illustrated in FIG. 7. For example, in one implementation, update message 700 may include a hardware descriptor field for carrying format information for Ethernet header of the data unit. In the same implementation, a flow record removal message may dispense with the address fields.

After flow table 414 is updated and an update message is sent, process 600 may return to block 602, to handle additional data units that arrive at fabric interface 412 and to continue to update flow table 414.

Exemplary Process for Sending a Message when a Flow Table is Updated

FIG. 6B is a flow diagram of an exemplary process 610 for sending a message from fabric interface 412 when flow table 414 is updated. At block 612, a flow record may be checked to determine if a sample data unit associated with the flow record is to be sent. The flow record may be checked when the data unit arrives at fabric interface 412. If a flow record associated with the data unit exists, sample field 516 in the flow record may be examined. Sample field 516 may indicate if the data unit may be sampled.

A sample data unit may be sent if the flow record indicates that the data unit is to be sampled (block 610). As explained in the above description of fabric interface 412, the data unit may be sampled in various ways, depending on control settings of network device 102.

In sending the sample data unit, a copy of the data unit may be encapsulated in a message (e.g., datagram) (see description of message 800 below with respect to FIG. 8) and sent from fabric interface 412 to another component in network device 102, if sample field 516 indicates a sample data unit is to be sampled.

Figure 8:
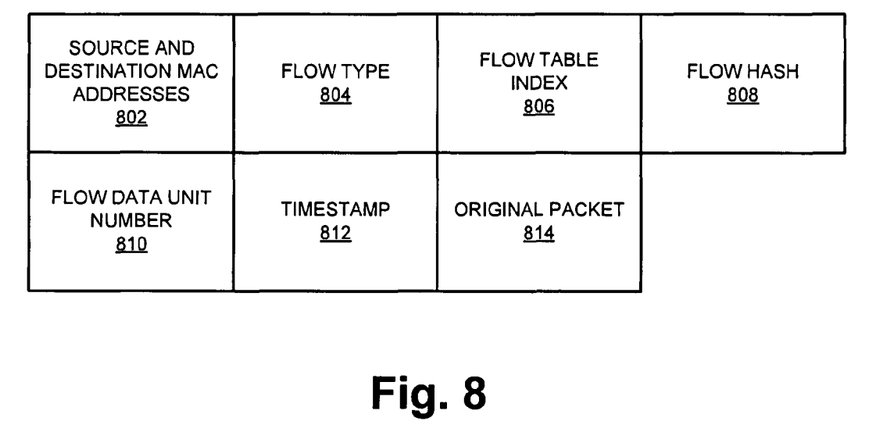
FIG. 8 is a block diagram of an exemplary message that carries a sample data unit.

FIG. 8 is a block diagram of an exemplary message 800 that encapsulates a data unit. As shown, the message may include a source and destination MAC addresses field 802 for designating source and destination components within network device 102; a flow type field 804 for indicating a flow type into which the data unit is classified; a flow table index field 806 for indicating the location, in the flow table, at which a flow record associated with the data unit may be found; a flow hash field 808 for carrying a hash of the flow record; a flow data unit number field 810 for tagging a data unit within a flow; a time stamp field 812 for indicating the time of the arrival of the data unit; and the original data unit field 814 for including the contents of the original data unit. Depending on implementation, message 800 may include additional, fewer, or different fields than those illustrated in FIG. 8.

Example

Figure 9:
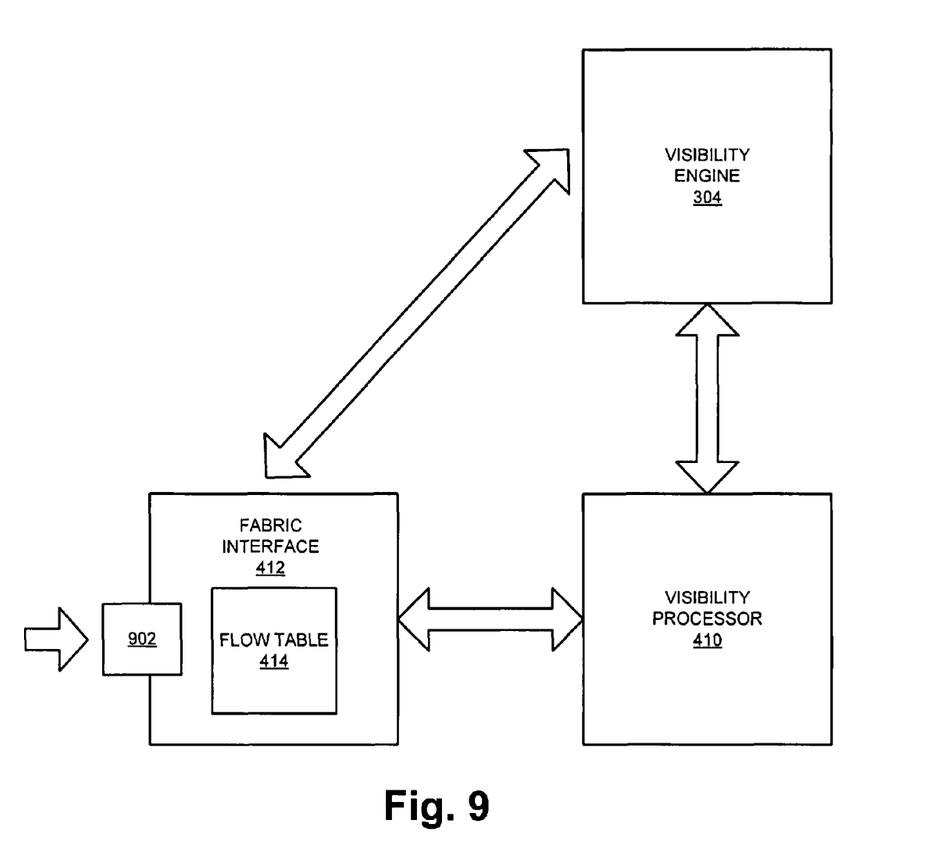
FIG. 9 illustrates an example of the management of the flow table of FIG. 5.

The following example, with reference to FIG. 9, illustrates one example of the management of flow table 414. The example is consistent with exemplary processes 600 and 610 described above with reference to FIGS. 6A and 6B.

In the example, as illustrated in FIG. 9, network device 102 includes fabric interface 412, a visibility engine 304, and a visibility processor 410. Furthermore, fabric interface 412 includes flow table 414. In other implementations, flow table 414 may be included in other components, such as forwarding module 402. In the example, assume that a data unit 902 arrives at fabric interface 412.

When data unit 902 arrives at fabric interface 412, flow table 414 is updated. To update flow table 914, a portion of header of data unit 902 is compared to portions of records in flow table 914. A match is found, and data unit count/byte field 514 is modified to reflect the additional number of data units/bytes that data unit 902 contributes to the flow associated with data unit 902.

In addition, sample field 516 indicates that a sample data unit needs to be sent from fabric interface 412. A message with the fields illustrated in FIG. 8 is constructed, and sent to visibility engine 304 for further analysis.

After data unit 902 is processed, no data unit that is part of the flow to which data unit 902 belongs arrives at fabric interface 412. Contents of aging count field 522 are found to be equal to zero. The flow record of the flow for data unit 902 is removed from flow table 414. Furthermore, a flow record removal message with the fields shown in FIG. 7 is assembled and sent to visibility processor 410.

In the above example, fabric interface 412 may manage flow table 414. Because flow table 414 is positioned between switch fabric 206 and the point at which data unit forwarding lookup/processing occurs, information related to data units may be easily incorporated into flow table 414, with minimal latency to routing and/or switching. In addition, because flow table 414 may be uniformly located at points where all data units flow through, the flow table may be used to collect and manage flow statistics and samples (e.g., copies) of data units homogenously and therefore, conveniently.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 6A and 6B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving a data unit at a line interface of a network device;
   conveying, by a switch fabric in the line interface, the data unit to a first component included in the line interface;
   attempting, by the first component and based on the data unit, to update a flow table stored in the first component;
   sending, by the first component and in response to attempting to update the flow table, a message to a second component included in the line interface,
   where the message includes a flow table index field to store location information associated with a location, in the flow table, associated with the attempted update to the flow table;
   acquiring, by the second component and based on the message, information associated with the attempted update; and
   aggregating, by the second component and based on the information associated with the attempted update, one or more flow records in the flow table.

2. The method of claim 1, where updating the flow table includes:
   locating a record in the flow table based on a header of the data unit; and
   increasing a data unit count field and a byte count field in the record.

3. The method of claim 1, where the message further includes information indicating a creation of a new flow record in the flow table.

4. The method of claim 1, where attempting to update the flow table further includes:
   removing a flow record from the flow table when the flow record has not been modified for a period longer than a threshold.

5. The method of claim 4, where the message further includes information indicating that the flow record is removed from the flow table.

6. The method of claim 1, where attempting to update the flow table further includes:
   failing to create a new flow record when the flow table is full.

7. The method of claim 6, where the message indicates that a flow record is lost and that the flow table is not modified.

8. The method of claim 1, further comprising:
   sending a copy of the data unit to at least one of:
   the second component in the network device; or
   an external device.

9. The method of claim 8, further comprising:
   correlating the data unit with a flow.

10. The method of claim 1, where aggregating the flow records includes:
    aggregating the flow records in a shadow table that differs from the flow table.

11. The method of claim 1, further comprising:
    sending a long lived message to indicate a status of a flow record that has not been removed.

12. A network device comprising:
    a line interface, including:
      a component that includes a flow table, where the component is to:
        buffer a data unit that is received at the line interface,
        locate, in the flow table, a record of a flow associated with the data unit,
        send, based on the record and the received data unit, a sample data unit to an engine that is external to the line interface,
        modify the record, in the flow table, based on the data unit, and
        send, in response to modifying the record, an update message to a processor, the update message including a notification of a change in the record,
        where the notification of the change to the record includes information identifying a portion of the flow table associated with the record; and
    the processor to:
      access, based on the update message, information associated with the record, and
      aggregate flow records in a shadow table based on the information associated with the record,
    where the engine is further to receive and process the sample data unit.

13. The network device of claim 12, where the component includes:
    a fabric interface; or
    a forwarding module.

14. The network device of claim 12, where the component is further to:
    randomly select one or more flows for sampling data units.

15. The network device of claim 14, where the component is further to:
    sample a predetermined number of consecutive data units in the selected flow, the consecutive data units arriving before other data units in the selected flow.

16. The network device of claim 14, where the component is further to:
    randomly sample data units in the selected flow.

17. The network device of claim 14, where the component is further to:
    select two flows in opposite directions using a hash computed from a source address and a destination address of the received data unit, the hash being symmetric with respect to the source address and the destination address; and
    sample data units from the selected two flows.

18. The network device of claim 12, where the component is further to:
    select, for sampling data units, a flow based on a classification of a first data unit.

19. The network device of claim 18, where the component is further to:
    sample a predetermined number of consecutive data units in the selected flow, the consecutive data units arriving before other data units in the selected flow.

20. The network device of claim 18, where the component is further to:
   randomly sample data units in the selected flow.

21. The network device of claim 12, where the network device includes a router or a switch.

22. The network device of claim 12, where the update message further includes at least one of:
   a source port number associated with the received data unit,
   a destination port number associated with the received data unit, or
   a communication protocol associated with the received data unit.

23. The network device of claim 12, where the processor is further to:
   aggregate flow statistics, and
   export the aggregated flow statistics to a deep data inspection unit.

24. The network device of claim 23, where the deep data inspection unit is to:
   inspect a subset of data units that are received at the network device for at least one of: security violations; or identifications of applications.

25. A non-transitory computer readable medium comprising:
   one or more instructions which when executed by a first processor, cause the first processor to buffer a data unit that is received at a line interface;
   one or more instructions which when executed by the first processor, cause the first processor to locate, in a flow table, a record of a flow associated with the data unit;
   one or more instructions which when executed by the first processor, cause the first processor to send, based on the record and the received data unit, a sample data unit to an engine that is external to the line interface;
   one or more instructions which when executed by the first processor, cause the first processor to modify the record, in the flow table, based on the data unit; and
   one or more instructions which when executed by a first processor, cause the first processor to send, in response to modifying the record, an update message to a second processor, the update message including a notification of a change in the record, where the update message enables the second processor to access information associated with the change in the record.

26. The non-transitory computer readable medium of claim 25, where the instructions further comprise:
   one or more instructions to randomly select one or more flows for sampling data units.

27. The non-transitory computer readable medium of claim 26, where the instructions further comprise:
   one or more instructions to sample a predetermined number of consecutive data units in the selected flow, the consecutive data units arriving before other data units in the selected one or more flows.

28. The non-transitory computer readable medium of claim 26, where the instructions further comprise:
   one or more instructions to randomly sample data units in the selected flow.

29. The non-transitory computer readable medium of claim 26, where the instructions further comprise:
   one or more instructions to select, for sampling data units, two flows in opposite directions using a hash computed from a source address and a destination address of the received data unit, the hash being symmetric with respect to the source address and the destination address.

30. The non-transitory computer readable medium of claim 26, where the instructions further comprise:
   one or more instructions to select, for sampling data units, a flow based on a classification of a first data unit.

31. The non-transitory computer readable medium of claim 30, where the instructions further comprise:
   one or more instructions to sample a predetermined number of consecutive data units in the selected flow, the consecutive data units arriving before other data units in the selected flow.

32. The non-transitory computer readable medium of claim 30, where the instructions further comprise:
   one or more instructions to randomly sample data units in the selected flow.

33. The non-transitory computer readable medium of claim 25, where the network device includes a router or a switch.

34. The non-transitory computer readable medium of claim 25, where the update message further includes at least one of:
   information identifying a source port number associated with the received data unit,
   information identifying a destination port number associated with the received data unit, or
   information identifying a communication protocol associated with the received data unit.

* * * * *